United States Patent
Schellekens et al.

[11] 3,765,901
[45] Oct. 16, 1973

[54] SPECTRAL SENSITIZATION OF LIGHT-SENSITIVE SILVER HALIDE EMULSIONS

[75] Inventors: Jozef Remy Schellekens, Wilsele; Theofiel Hubert Ghys, Kontich; Henri Depoorter, Mortsel, all of Belgium

[73] Assignee: Gevaert-Agfa N.V., Mortsel, Belgium

[22] Filed: Jan. 20, 1971

[21] Appl. No.: 108,164

[30] Foreign Application Priority Data
Feb. 17, 1970 Great Britain.................... 7,585/70

[52] U.S. Cl............ 96/140, 96/36.2, 96/48 QP UX, 96/50 R, 96/95, 260/210.4
[51] Int. Cl......................... G03c 1/22, G03c 1/06
[58] Field of Search......................... 96/140

[56] References Cited
UNITED STATES PATENTS

| | | | |
|---|---|---|---|
| 2,493,748 | 1/1950 | Brooker et al....................... | 96/140 |
| 2,497,876 | 2/1950 | Fallesen et al....................... | 96/140 |
| 2,719,152 | 9/1955 | Jeffreys................................ | 96/140 |
| 2,728,766 | 12/1955 | Knott.................................... | 96/140 |

Primary Examiner—Norman G. Torchin
Assistant Examiner—M. Kelley
Attorney—Brufsky, Staas, Breiner & Halsey

[57] ABSTRACT

Novel merocyanine dyes are provided which correspond to the general formula:

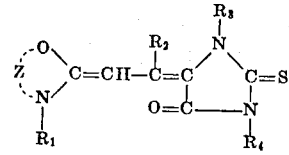

wherein:
Z stands for the atoms necessary to close an oxazole nucleus,
$R_1$ stands for an aliphatic or aromatic group,
$R_2$ stands for hydrogen, an alkyl group, an aralkyl group, an aryl group or a cycloalkyl group, and
each of $R_3$ and $R_4$ stands for alkoxycarbonylalkyl.

These merocyanine dyes can be used for the spectral sensitization of light-sensitive silver halide emulsions. They do not enhance the fog and leave practically no residual stain after processing and therefore are particularly suitable for the sensitization of Lippmann-emulsions, emulsions of the lith-type and emulsions used in stabilisation processing.

11 Claims, No Drawings

SPECTRAL SENSITIZATION OF LIGHT-SENSITIVE SILVER HALIDE EMULSIONS

The present invention relates to novel merocyanine dyes, to the preparation thereof, to their use as spectral sensitizers for light-sensitive elements, more particularly silver halide emulsion layers, and to light-sensitive elements sensitized therewith.

In accordance with the present invention novel merocyanine dyes are provided which correspond to the following general formula I :

I
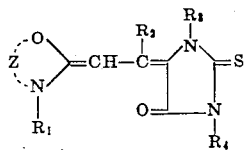

wherein :
Z stands for the atoms necessary to close an oxazole ring including substituted oxazole and oxazole with fused-on aromatic ring such as benzoxazole, $R_1$ represents a saturated or unsaturated aliphatic group or an aromatic group, which groups may be substituted, e.g. an alkyl group such as methyl, ethyl, propyl, isopropyl, butyl or isobutyl, a substituted alkyl group such as β-hydroxyethyl, β-acetoxyethyl, carboxymethyl, carboxyethyl, sulphoethyl, sulphopropyl, sulphobutyl, sulphatopropyl, sulphatobutyl, phosphonoethyl, phosphonopropyl, phosphonobutyl, a group —A—CO—O—B—SO$_2$—OH wherein A and B have the same significance as set forth in United Kingdom Patent Specification 886,271 such as sulphocarbomethoxymethyl, ω-sulphocarbopropoxy-methyl, ω-sulphocarbobutoxymethyl, and p-( ω-sulphocarbo-butoxy)-benzyl, a group -A-W-NH-V-B as described in United Kingdom Patent Specification 904,332 wherein each of W and V represents carbonyl, sulphonyl or a single bond, at least one of W and V being sulphonyl, A represents an alkylene group e.g. a $C_1$—$C_4$ alkylene group and B represents hydrogen, alkyl, substituted alkyl, amino, substituted amino e.g. acylamino, diethylamino with the proviso however that B does not represent hydrogen when V stands for carbonyl or sulphonyl, the group AWNHVB being exemplified by N-(methylsulphonyl)-carbamoylmethyl, γ-(acetylsulphamoyl)-propyl, and δ-(acetylsulphamoyl)-butyl, an aralkyl group such as a benzyl, a substituted aralkyl group such as carboxybenzyl and sulphobenzyl, a cycloalkyl group such as cyclohexyl, an allyl group, an aryl group such as phenyl, and a substituted aryl group such as carboxyphenyl, $R_2$ stands for hydrogen, alkyl, substituted alkyl, aralkyl, substituted aralkyl, cycloalkyl, substituted cycloalkyl, aryl or substituted aryl, and each of $R_3$ and $R_4$ stands for alkoxycarbonylalkyl for example alkoxycarbonylmethyl.

The acidic groups may be present in the free acid form or the salt form.

Representative examples of merocyanine dyes corresponding to the above general formula are given in the following table.

TABLE 1

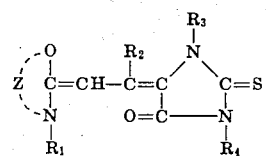

| Dye | 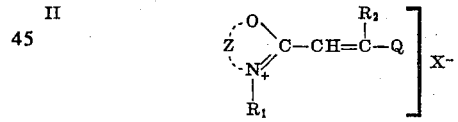 | $R_1$ | $R_2$ | $R_3$ | $R_4$ | Abs. max. (nm.) | $\epsilon \cdot 10^{-4}$ |
|---|---|---|---|---|---|---|---|
| 1 | Benzoxazole | $CH_2CONHSO_2CH_3 \cdot N(C_2H_5)_3$ | H | $CH_2COOC_2H_5$ | $CH_2COOC_2H_5$ | 482 | 8.6 |
| 2 | do | $C_2H_5$ | H | $CH_2COOC_2H_5$ | $CH_2COOC_2H_5$ | 482 | 7.6 |
| 3 | do | $(CH_2)_3OSO_3Na$ | H | $CH_2COOC_2H_5$ | $CH_2COOC_2H_5$ | 485 | 7.2 |
| 4 | do | $(CH_2)_3SO_3H \cdot N(C_2H_5)_3$ | H | $CH_2COOC_2H_5$ | $CH_2COOC_2H_5$ | 482 | 8.0 |
| 5 | do | $(CH_2)_4SO_2NHCOCH_3$ | H | $CH_2COOC_2H_5$ | $CH_2COOC_2H_5$ | 484 | 7.6 |
| 6 | 5-chlorobenzoxazole | $(CH_2)_3SO_3Na$ | H | $CH_2COOC_2H_5$ | $CH_2COOC_2H_5$ | 479 | 8.3 |
| 7 | 6-methoxybenzoxazole | $(CH_2)_3SO_3Na$ | H | $CH_2COOC_2H_5$ | $CH_2COOC_2H_5$ | 492 | 8.4 |

NOTE: The spectral date given in the table were obtained from measurements with solutions of the dyes in methanol, except for dye 5 that was measured in ethylene glycol monomethyl ether.

The merocyanine dyes according to the present invention can be prepared by methods known to those skilled in the art, e.g. by condensing a cyclammonium quaternary salt corresponding to the formula II :

II
$$\left[ \underset{R_1}{Z\diagup\!\!\!\!\!\!\!\!\!\!\overset{-O}{\underset{-N^+}{\diagdown}}}C-CH=\overset{R_2}{\underset{|}{C}}-Q \right] X^-$$

wherein :
Z, $R_1$ and $R_2$ have the same significance as above,
Q stands for arylamino preferably acylated arylamino e.g. acetanilino, and
$X^-$ stands for an anion, but does not exist when $R_1$ contains an anionic group, with a thiohydantoine compound of the formula III :

III
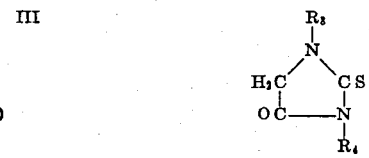

wherein :
each of $R_3$ and $R_4$ have the same significance as above.

The condensations are advantageously carried out in the presence of a basic condensing agent e.g. a tertiary amine such as trimethylamine, triethylamine, dimethylaniline, or a N-alkyl-piperidine. A reaction medium is advantageously employed e.g. pyridine, a lower molecular weight alcohol such as ethanol, dimethylsulphoxide, acetonitrile, etc.

The following preparations serve to illustrate the preparation of intermediates corresponding to the above formulae II and III.

PREPARATION 1

2-(2-anilinovinyl)-3-methylsulphonylcarbamoyl-methylbenzoxazolium bromide

Thirty ml of acetic anhydride, 20.8 g (0.106 mole) of diphenyl-formamidine and 18.4 g (0.053 mole) of 2-methyl-3-methylsulphonyl-carbamoylmethyl-benzoxazolium bromide were heated on an oil bath at 130°C. The mixture became a homogeneous melt and then solidified. Heating should not exceed 10 minutes. Upon cooling, acetone was added and the product collected. It was washed with acetone and ether.

Yield : 11.5 g (48 %).

Melting point : above 260°C.

In a similar way were prepared :
anhydro-2-(2-anilinovinyl)-3-(3-sulphatopropyl)-benzoxazolium hydroxide (melting point : 236°-238°C - yield : 93 percent), and 2-(2-anilinovinyl)-3-(4-acetylsulphamoylbutyl)-benzoxazolium bromide (melting point : 238°-240°C - yield : 44 percent).

PREPARATION 2

1,3-bisethoxycarbonylmethyl-thiohydantoine eighteen g (0.125 mole) of ethoxycarbonylmethyl isothiocyanate, 28.2 g (0.125 mole) of diethyliminodiacetate hydrochloride and 60 ml of pyridine were refluxed for 30 minutes. After dilution with water, the thiohydantoine formed was extracted with methylene chloride, dried over magnesium sulphate and distilled. The fraction boiling at 230°-234°C/10 mm was collected.

Yield : 25 g ( 69 percent).

The following preparations serve to illustrate the preparation of the dyes according to the invention.

PREPARATION 3 - DYE 1

A mixture of 1.44 g (0.005 mole) of 1,3-bisethoxycarbonyl-methyl-thiohydantoine, 2.26 g (0.005) of 2-(2-anilinovinyl)-3-methylsulphonylcarbamoylmethyl-benzoxazolium bromide, 20 ml of dimethylsulphoxide, 1 ml (0.01 mole) of triethylamine and 1 ml of acetic anhydride was heated to 40°C. After 10 minutes, 10 ml of ethanol were added whereupon the dye was precipitated by pouring the mixture into a mixture of ether and hexane (1:1). The dye was purified by recrystallisation from isopropanol with a few drops of water. Yield : 0.95 g (28 percent). Melting point : above 260°C.

PREPARATION 4 — DYE 2

A mixture of 2.88 g (0.01 mole) of 1,3-bisethoxycarbonyl-methyl-thiohydantoine, 3.92 g (0.01 mole of 2-(2-anilinovinyl)-3-ethylbenzoxazolium iodide, 15 ml of dimethylsulphoxide, 1.4 ml (0.01 mole) of triethylamine and 1.1 ml (0.01 mole) of acetic anhydride was kept at ambient temperature. After about 15 minutes, the dye began to crystallize. Crystallization was completed by addition of water. The dye was collected by filtering with suction whereupon it was recrystallized from 2-methoxyethanol. Yield : 2.7 g (59 %). Melting point : 160°-165°C.

PREPARATION 5 — DYE 3

The condensation reaction was carried out as described in preparation 5 using 3.74 g (0.01 mole) of anhydro-2-(2-anilinovinyl)-3-(3-sulphatopropyl)-benzoxazolium hydroxide instead of the 2-(2-anilinovinyl)-3-ethylbenzoxazolium bromide and 0.02 mole of triethylamine instead of 0.01 mole. The dye was precipitated by pouring the reaction mixture into ether/hexane (1:1). The sticky precipitate was dissolved in ethanol and then converted into the sodium salt by pouring into an aqueous solution of sodium iodide. The dye was recrystallized from dimethylformamide/water (6:1). Yield : 3 g (51 percent). Melting point : 180°C (with decomposition).

In accordance with the present invention photographic materials are provided comprising light-sensitive silver halide emulsion layers containing a merocyanine dye corresponding to the above general formula.

The hydrophilic colloid used as the vehicle for the silver halide may be any of the common hydrophilic colloids employed in photographic light-sensitive emulsions, for example gelatin, agar-agar, albumine, zein, casein, collodion, alginic acid, water-soluble cellulose derivatives such as carboxymethylcellulose, polyvinyl alcohol, poly-N-vinyl pyrrolidone or other hydrophilic synthetic or natural resins or polymeric compounds, gelatin being however favoured. If desired, compatible mixtures of two or more colloids may be employed for dispersing the silver halide.

The merocyanine dyes according to the present invention have an excellent sensitizing action in the green region of the spectrum and this sensitizing activity is not influenced under conditions of increased temperature and relative humidity. Since the dyes according to the present invention do not enhance the fog and leave practically no residual stain after processing they are particularly suitable for the sensitization of emulsions of the Lippmann-type, especially the high-resolution Lippmann-emulsions of use for microelectronic mask-making used in the production of microelectronic integrated circuits, for the sensitization of emulsions of the lith-type of use in photomechanical reproduction techniques, and for the sensitization of emulsions of use in stabilization processing according to which the photographic record is produced in the least possible time.

Photographic materials of use for microelectronic mask making comprise silver halide emulsion layers of the Lippmann-type having a layer thickness comprised between 3 and 8 microns. These silver halide emulsions of the Lippmann-type have an average grain-size of less than 0.1 micron; they are preferably gelatino silver bromide emulsions which may comprise at most 8 mole percent of silver iodide and have a ratio of silver halide to gelatin comprised between 1:15 and 5:1. They should allow a correct reproduction of the dimensions of the integrated circuit images and therefore should be substantially free from staining.

Photographic materials of use for photomechanical reproduction techniques comprising silver halide emulsion layers of the lith-type, i.e. fine-grained emulsions of high contrast containing at least 50 mole percent of silver chloride, should also be substantially free of staining so that very sharp screen dots and screen lines can be obtained. Emulsions of the lith-type are usually developed in developers containing only hydroquinone as developing agent and having a low sulphite content which is achieved by the presence of formaldehyde forming formaldehyde-bisulphite compounds keeping the sulphite concentration at a low and constant value.

In stabilization processing the residual non-exposed and non-developed silver halide is converted into light-inert complexes with the aid of a stabilizing solution comprising stabilizing agents. In these processes development is usually effected by means of a simple alkaline solution the developing agents being incorporated into the photographic emulsion layers. Since stabilization processing occurs very rapidly, the whole processing generally lasting less than 1 minute, the sensitizing dyes used should be such that they are removed or decolourised in this short processing time so that no stain is left in the material. In stabilization processing the silver halide emulsion layer(s) is (are) preferably pure silver chloride emulsions or silver chlorobromide or silver chlorobromoiodide emulsions having at least 90 mole percent of silver chloride and an average silver halide grain-size which is comprised between 0.1 and 0.3 microns. An emulsion layer of this type is characterized in that the latent image produced on image-wise exposure is fully developed within 10 seconds upon contact of the solution effecting development with the image-wise exposed silver halide grains.

Most of the known sensitizing dyes, even those comprising solubilizing groups and though they are satisfactory for use in ordinary photographic materials that are processed in the classical way, were found to be unsuitable for the above applications because they produce stains and undesirable colourations.

The methods of incorporating the dyes in the emulsions are simple and well known to those skilled in the art of emulsion making. They are generally added to the emulsion in the form of a solution in a suitable solvent e.g. an alcohol such as methanol, or a mixture of an alcohol and water. The solvent must of course be compatible with the emulsions and substantially free from any deleterious effect on the light-sensitive material.

The sensitizing dyes of use according to the invention can be incorporated at any stage of emulsion preparation and should be uniformly distributed throughout the emulsion. They are preferably incorporated after the chemical ripening and just before coating.

Various silver salts may be used as the light-sensitive salt such as silver chloride, silver bromide, silver iodide or mixed silver halides such as silver chlorobromide, silver bromoiodide and silver chlorobromoiodide.

The concentration in the emulsion of the sensitizing dyes corresponding to the above general formula I can vary between wide limits, for example from 1 mg to 1,000 mg per mole of silver halide. The most suitable and most economical concentration for any given emulsion will be apparent to those skilled in the art of emulsion making; it will vary according to the type of light-sensitive material and according to the effects desired.

The dyes are preferably incorporated into photographic emulsions the general sensitivity of which has been increased by chemical ripening. These emulsions may be chemically sensitized by effecting the ripening in the presence of small amounts of sulphur containing compounds such as allyl isothiocyanate, allyl thiourea, sodium thiosulphate, potassium selenocyanide, etc. The emulsions may also be sensitized by means of reducing sensitizers such as tin compounds, imino-aminomethane sulphinic acid and derivatives thereof, cadmium salts, and the salts of noble metals such as gold, platinum, palladium, iridium, ruthenium and rhodium.

The dyes according to the present invention are not influenced by other emulsion additives such as hardeners, antifoggants, stabilizers, colour couplers, wetting agents, development accelerators, plasticizers, etc. and are fully compatible with developing agents that might be present in the emulsion e.g. as is often done in material for stabilization processing.

Suitable hardening agents are amongst others formaldehyde, chrome alum, halogen-substituted aldehydes comprising a carboxyl group such as mucobromic acid, diketones, dialdehydes, etc.

Compounds suitable for sensitizing the emulsions by development acceleration are e.g. compounds of the polyoxyalkylene type such as alkylene oxide condensation products as described amongst others in U.S. Pat. specifications Nos. 2,531,832 and 2,533,990, in United Kingdom Patent Specifications 920,637, 940,051, 945,340 and 991,608 and in Belgian Patent Specification 648,710 as well as onium derivatives of amino-N-oxides as described in United Kingdom Patent Specification 1,121,696.

Among the stabilizers customarily employed in emulsion may be mentioned mercury compounds such as the mercury compounds described in Belgian Patent Specifications 524,121, 677,337 and 707,386, U.S. Pat. specification No. 3,179,520, heterocyclic nitrogen containin thioxo compounds such as those described in German Patent Specification 1,151,731, benzothiazoline-2-thione and 1-phenyl-2- tetrazoline-5-thione and compounds of the hydroxy-triazolopyrimidine type such as 5-methyl-7-hydroxy-s-triazolo [1,5-a]pyrimidine.

The emulsions sensitized in accordance with the present invention may be coated on a wide variety of photographic emulsion supports. Typical supports include cellulose ester film, polyvinyl acetal film, polystyrene film, polyethylene terephthalate film and related films of resinous materials as well as paper and glass.

The following examples illustrate the present invention.

EXAMPLE 1

Identical portions of a lithographic silver halide emulsion, comprising 76 mole percent of silver chloride, 23 mole percent of silver bromide and 1 mole percent of silver iodide, were spectrally sensitized by means of the dyestuffs listed in the table below.

The spectrally sensitized emulsion portions ready for coating contained 0.6 mole of silver halide per kg and 0.1 millimole of spectral sensitizer per mole of silver halide. Each of the emulsion portions was coated on a subbed polyethylene terephthalate support pro rata of 0.07 mole of silver halide per sq.m.

The sensitometric values obtained are listed in the table below. The sensitivity data are those measured upon exposure through a yellow filter that absorbs all light of a wavelength shorter than 460 nm, as compared with a not spectrally sensitized material.

TABLE 2

| Spectrally sensitizing dye | Δ log It* | Sens.max. (nm) | Stain |
| --- | --- | --- | --- |

| | | | |
|---|---|---|---|
| 1 | +2.63 | 540 | no |
| 2 | +2.70 | 540 | trace of orange |
| 4 | +2.70 | 530 | no |
| 5 | +2.78 | 530 | trace of orange |

* $\Delta$ log It = +0.30 means a doubling of the speed

EXAMPLE 2

Spectrally sensitized emulsion portions were prepared as described in example 1. Each of the emulsion portions was coated on a subbed polyethylene terephthalate support pro rata of 0.07 mole of silver halide per sq.m.

The materials obtained were exposed in a sensitometer once without filter (general sensitivity) and once through a filter (spectral sensitivity) the transmission of which for light of a wavelength shorter than 390 nm is less than 0.1 percent and for light of a wavelength longer than 470 nm is more than 90 percent.

The sensitometric results obtained as well as the percentage residual staining measured after processing at the $\lambda_{max}$ of the dyestuff concerned are listed in the table below.

TABLE

| | | Exposure without filter | | Exposure through filter | | |
|---|---|---|---|---|---|---|
| Dye used | Sens. max. nm. | Fog | Relative general speed* (log It) | Fog | Relative spectral speed* (log It) | Percent residual staining |
| None | | 0.04 | 4 | 0.04 | | |
| Comparison dye with formula: (structure shown) | 540 | 0.05 | 2.77 | 0.05 | 2.75 | 11 |
| Dye 3 | 535 | 0.04 | 3.05 | 0.04 | 3.00 | 1 |

*A decrease of the value by 0.3 means a doubling of the speed.

EXAMPLE 3

A silver bromide emulsion comprising 72 g of silver bromide and 93 g of gelatin was prepared by simultaneous addition of a silver nitrate solution and a potassium bromide solution to a 3 percent aqueous solution of gelatin. The conditions of precipitation were adjusted so that a Lippmann emulsion with an average grain size of 0.07 $\mu$ was obtained. Details as to preparation of Lippmann emulsions can be found amongst others in P. Gladkides "Photographic Chemistry," Vol. 1, 1958, Fountain Press, London. The emulsion was divided into several portions and to each portion one of the sensitizers listed in the table below were added in an amount of 0.1 millimole per mole of silver halide.

The emulsions were then coated on glass plates and dried so as to obtain an emulsion layer thickness of 5 microns.

The materials thus obtained were exposed in a sensitometer once without filter (general sensitivity) and once through a filter (spectral sensitivity) the transmission of which for light of a wavelength shorter than 460 nm is less than 0.1 percent and for light of a wavelength longer than 550 nm is more than 90 percent.

The sensitometric results obtained as well as the percentage residual staining measured after processing at the $\lambda_{max}$ of the dyestuff concerned are listed in the table below.

TABLE

| | | Exposure without filter | | Exposure through filter | | |
|---|---|---|---|---|---|---|
| Dye used | Sens. max. nm. | Fog | Relative general speed* (log It) | Fog | Relative spectral speed* (log It) | Percent residual staining |
| None | | 0.04 | 2.87 | 0.04 | | |
| Comparison dye with formula: (structure shown) | 540 | 0.05 | 2.05 | 0.05 | 2.32 | 10 |
| Dye 3 | 535 | 0.05 | 2.15 | 0.05 | 2.36 | 3 |

EXAMPLE 4

A cellulose triacetate film support was provided at one side with a gelatin antihalation layer and at the other side with a gelatin-cellulose nitrate subbing layer, a gelatin intermediate layer having a dry weight of 4.0 g per sq.m, a light-sensitive gelatin silver halide emulsion layer containing hydroquinone and 1-phenyl-3-pyrazolidinone and a gelatin antistress layer comprising 1.5 g of gelatin per sq.m.

The silver halide emulsion used was a rapidly developable silver chlorobromoiodide (98 mole percent chloride, 1.8 mole percent bromide and 0.2 mole percent iodide) emulsion having an average grain size of about 1.8 micron and a ratio of gelatin to silver nitrate of 0.75 and comprising as spectral sensitizer one of the dyes listed in the table below in an amount of 88 mg per 100 g of silver nitrate used.

It was applied in such a way that per sq.m 2 g of hydroquinone, 0.3 g of 1-phenyl-3-pyrazolidinone and an amount of silver halide equivalent to 5.0 g of silver nitrate were present.

The light-sensitive material was image-wise exposed in a sensitometer whereupon it was guided in a compact automatic processing unit at a constant speed in order through the following four processing solutions at room temperature:

1. Activator liquid
sodium hydroxide 30 g
sodium sulphite 50 g
potassium bromide 2 g
water to make 1000 ml
2 Stabilizing liquid
ammonium thiocyanate 250 g
sodium metabisulphite 20 g
water to make 1000 ml
sulphuric acid to adjust the pH to 4.5.
3. A Fixer
sodium thiosulphate 200 g
potassium metabisulphite 25 g
water to make 1000 ml
4. A rinsing liquid consisting of demineralised water The total processing time was 16 seconds (i.e. 4 seconds for each of the processing liquids).

The values of fog and the percentage residual staining measured after processing at the $\lambda_{max}$ of the dyestuff concerned are listed in the table below.

TABLE

| Dyestuff used | Sens. max., nm. | Fog | Relative speed | Percent residual staining |
|---|---|---|---|---|
| Comparison dye with formula: | 540 | 0.08 | 0.71 | 10 |
| Dye 1 | 540 | 0.05 | 1.49 | 2 |
| Dye 4 | 530 | 0.06 | 1.03 | 3 |

We claim:
1. A light-sensitive silver halide emulsion spectrally sensitized by means of a merocyanine dye corresponding to the formula:

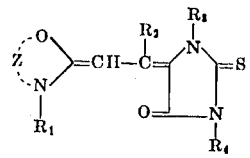

wherein:
Z stands for the atoms necessary to close a benzoxazole nucleus,
$R_1$ stands for a saturated or unsaturated aliphatic group or an aromatic group,
$R_2$ stands for hydrogen, an alkyl group, an aralkyl group, an aryl group or a cycloalkyl group, and each of $R_3$ and $R_4$ stands for alkoxycarbonylalkyl.

2. A light-sensitive emulsion according to claim 1, wherein said dye is present in an amount of 1 to 1,000 mg per mole of silver halide.

3. A light-sensitive emulsion according to claim 1, wherein said emulsion is an emulsion of the Lippmann-type having an average silver halide grain-size of less than 0.1 micron.

4. A light-sensitive emulsion according to claim 1, wherein said emulsion is an emulsion of the lith-type comprising at least 50 mole percent of silver chloride.

5. A light-sensitive emulsion according to claim 1, wherein said emulsion is a rapidly developable emulsion for stabilization processing comprising at least 90 mole percent of silver chloride.

6. The light-sensitive silver halide emulsion of claim 1 wherein the benzoxazole is chlorobenzoxazole.

7. The light-sensitive silver halide emulsion of claim 1 wherein the benzoxazole is methoxybenzoxazole.

8. The light-sensitive silver halide emulsion of claim 1 wherein $R_1$ is $CH_2CONHSO_2CH_3.N(C_2H_5)_3$; $R_2$ is H; $R_3$ is $CH_2COOC_2H_5$; and $R_4$ is $CH_2COOC_2H_5$.

9. The light-sensitive silver halide emulsion of claim 1 wherein $R_1$ is $C_2H_5$; $R_2$ is H; $R_3$ is $CH_2COOC_2H_5$; and $R_4$ is $CH_2COOC_2H_5$.

10. The light-sensitive silver halide emulsion of claim 9 wherein $R_1$ is $(CH_2)_3OSO_3Na$; $R_2$ is H; $R_3$ is $CH_2COOC_2H_5$; and $R_4$ is $CH_2COOC_2H_5$.

11. The light-sensitive silver halide emulsion of claim 1 wherein $R_1$ is $(CH_2)_3SO_3H.N(C_2H_5)_3$; $R_2$ is H; $R_3$ is $CH_2COOC_2H_5$; and $R_4$ is $CH_2COOC_2H_5$.

* * * * *